United States Patent
Weaver et al.

(10) Patent No.: US 10,150,907 B2
(45) Date of Patent: Dec. 11, 2018

(54) SEQUENTIAL SURFACTANT TREATMENTS FOR ENHANCING FRACTURING FLUID RECOVERY

(71) Applicant: Halliburton Energy Services, Inc., Houston, TX (US)

(72) Inventors: Jim Weaver, Duncan, OK (US); Michael McCabe, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 10 days.

(21) Appl. No.: 14/913,954

(22) PCT Filed: Sep. 26, 2013

(86) PCT No.: PCT/US2013/061817
§ 371 (c)(1),
(2) Date: Feb. 23, 2016

(87) PCT Pub. No.: WO2015/047263
PCT Pub. Date: Apr. 2, 2015

(65) Prior Publication Data
US 2016/0215202 A1    Jul. 28, 2016

(51) Int. Cl.
*C09K 8/62* (2006.01)
*C09K 8/60* (2006.01)
(Continued)

(52) U.S. Cl.
CPC .............. *C09K 8/602* (2013.01); *C09K 8/584* (2013.01); *C09K 8/62* (2013.01); *E21B 21/003* (2013.01); *E21B 43/16* (2013.01); *E21B 43/26* (2013.01)

(58) Field of Classification Search
None
See application file for complete search history.

(56) References Cited

U.S. PATENT DOCUMENTS 2,800,962 A * 7/1957 Garst ..................... C09K 8/584
166/270
3,080,920 A * 3/1963 Fast .......................... C09K 8/62
166/283
(Continued)

FOREIGN PATENT DOCUMENTS

GB    2062063 A * 5/1981 ............... C09K 8/58
WO   2011/012164 A1    2/2011

OTHER PUBLICATIONS

International Preliminary Report on Patentability issued in related application PCT/US2013/061817, dated Apr. 7, 2016. 10 pages.
(Continued)

*Primary Examiner* — Angela M DiTrani Leff
(74) *Attorney, Agent, or Firm* — Thomas Rooney; Baker Botts L.L.P.

(57) ABSTRACT

Methods involving the sequential application of surfactants to improve fluid recovery and control fluid loss in conjunction with subterranean fracturing treatments are provided. In one embodiment, the methods comprise: introducing a first surfactant into a portion of a subterranean formation; allowing the first surfactant to increase the oil-wettability of at least a portion of a fracture face in the portion of the subterranean formation; ceasing the introduction of the first surfactant into the portion of the subterranean formation; introducing a second surfactant into the portion of the subterranean formation; and allowing the second surfactant to increase the water-wettability of the portion of the fracture face in the portion of the subterranean formation.

20 Claims, 7 Drawing Sheets

(51) Int. Cl.
*E21B 43/26* (2006.01)
*E21B 21/00* (2006.01)
*C09K 8/584* (2006.01)
*E21B 43/16* (2006.01)

(56) References Cited

U.S. PATENT DOCUMENTS

| | | | | | |
|---|---|---|---|---|---|
| 3,098,038 | A | * | 7/1963 | Hibbs | C09K 8/62 |
| | | | | | 166/278 |
| 3,548,941 | A | * | 12/1970 | Graham | C09K 8/58 |
| | | | | | 166/270.1 |
| 3,628,615 | A | * | 12/1971 | Chenevert | C09K 8/26 |
| | | | | | 166/275 |
| 4,745,976 | A | | 5/1988 | Harwell et al. | |
| 4,842,065 | A | * | 6/1989 | McClure | E21B 43/18 |
| | | | | | 166/270.1 |
| 5,042,580 | A | * | 8/1991 | Cullick | C09K 8/60 |
| | | | | | 166/252.1 |
| 2008/0035337 | A1 | * | 2/2008 | Reddy | C09K 8/68 |
| | | | | | 166/276 |
| 2009/0205823 | A1 | * | 8/2009 | Mohanty | C09K 8/584 |
| | | | | | 166/270.1 |
| 2009/0209438 | A1 | | 8/2009 | Thieme et al. | |
| 2009/0288825 | A1 | | 11/2009 | Tang | |
| 2010/0163234 | A1 | * | 7/2010 | Fuller | C09K 8/584 |
| | | | | | 166/278 |
| 2011/0174485 | A1 | | 7/2011 | Robb et al. | |
| 2012/0160497 | A1 | * | 6/2012 | Varadaraj | C09K 8/035 |
| | | | | | 166/305.1 |

OTHER PUBLICATIONS

International Search Report and Written Opinion issued in related PCT Application No. PCT/US2013/061817 dated Jun. 25, 2014, 13 pages.
Economides et al. Petroleum Well Construction ISBN 0-471-96938-9, 1998 (pp. 471-498).
FracFocus Chemical Disclosure Registry, "Hydraulic Fracturing: The Process" (archived as available on Mar. 17, 2013 at https://web.archive.org/web/20130317111015/http://www.fracfocus.ca/hydraulic-fracturing-how-it-works/hydraulic-fracturing-process (2 pages).

* cited by examiner

SEQUENTIAL SURFACTANT TREATMENTS FOR ENHANCING FRACTURING FLUID RECOVERY

CROSS-REFERENCE TO RELATED APPLICATION

The present application is a U.S. National Stage Application of International Application No. PCT/US2013/061817 filed Sep. 26, 2013, which is incorporated herein by reference in its entirety for all purposes.

BACKGROUND

The present disclosure relates to methods and treatments used in conjunction with subterranean fracturing treatments, and more specifically, to methods involving the sequential application of surfactants to improve fluid recovery and control fluid loss in conjunction with those treatments.

Fracturing treatments are commonly used in subterranean operations, among other purposes, to stimulate the production of desired fluids (e.g., hydrocarbons, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The creation and/or enhancement of these fractures, among other things, may enhance the flow of fluids through the subterranean formation so that they may be produced out of the subterranean formation (e.g., into and out of a well bore penetrating at least a portion of the subterranean formation) more readily. Such fracturing treatments also may be performed in combination with other subterranean treatments useful in the particular formation, such as gravel packing and/or acidizing treatments, which may be referred to as "frac-packing" and "frac-acidizing" treatments, respectively.

Providing effective fluid loss control in subterranean fracturing treatments is often desirable. "Fluid loss," as that term is used herein, refers to the undesirable migration, leak off, or other loss of fluids (e.g., a fracturing fluid) into a subterranean formation and/or a proppant pack. The loss of fracturing fluid into the formation during a fracturing operation may result in a reduction in fluid efficiency, such that the fracturing fluid cannot propagate the fracture as desired. In carrying out subterranean fracturing treatments, recovery of the fracturing fluid out of the formation also may be critical once the fracturing treatment has been completed, among other reasons, so that hydrocarbons and/or other fluids can flow more freely through the fractured zone and out of the well bore. Aqueous-based fracturing fluids also may cause high capillary pressures in the formation matrix, which may restrict the flow of produced hydrocarbons. Capillary pressures of several thousand psi may result in low permeability formations when water is introduced, wherein the high pressure differential needed to initiate the fluid flow may result in extended fluid recovery times, long term losses in the relative permeability to gaseous hydrocarbons, and long term loss of effective fracture half length.

In conventional treatments, surfactants may be added to the fracturing fluid(s) used during a subterranean fracturing treatment in order to reduce interfacial tensions between oil and water in the formation, reduce capillary pressure in the formation matrix, and facilitate flow in the fractures. However, these conventional methods often involve applying the surfactant throughout the entire fracturing treatment, which may require large amounts of those components that are often wasted due to fluid loss or inefficient treatment of the formation. Hydrocarbon fluids such as diesel or kerosene also may be added to fracturing fluids to reduce fluid leak off into the formation and facilitate flow. However, these hydrocarbon additives may introduce undesirable environmental properties and safety hazards, form undesired emulsions, damage formations, and/or their use may be prohibited in certain parts of the world.

BRIEF DESCRIPTION OF THE FIGURES

Some specific example embodiments of the disclosure may be understood by referring, in part, to the following description and the accompanying drawings.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed. On the contrary, this disclosure is to cover all modifications and equivalents as illustrated, in part, by the appended claims.

DETAILED DESCRIPTION

The present disclosure relates to methods and treatments used in conjunction with subterranean fracturing treatments, and more specifically, to methods involving the sequential application of surfactants to improve fluid recovery and control fluid loss in conjunction with those treatments.

The methods and treatments of the present disclosure generally involve treating a fracture face in a subterranean formation with different types of surfactants to selectively alter the wettability of the fracture face during different stages of a treatment such as a fracturing treatment. The term "fracture face" as used herein refers to a surface of a fracture (e.g., crack or breakage) within rock. In the methods of the present disclosure, a first surfactant is introduced into a fracture in the subterranean formation so as to increase the oil-wettability of at least a portion of the fracture face. In certain embodiments, this may reduce the loss of fluid into the formation through the fracture face and thus improve fracturing efficiency. At some point thereafter, the introduction of the first surfactant into the well bore is ceased, and a second surfactant (which is usually different from the first surfactant) is introduced into the fracture in the formation so as to increase the water-wettability of at least a portion of the fracture face. In certain embodiments, this may promote the flow of water-based fluids (e.g., fracturing fluids) through the fracture and thus improve the recovery rate of those fluids out of the formation.

Among the many potential advantages of the present disclosure, the methods and treatments of the present disclosure may, among other things, reduce the loss of fluid into the formation and improve fracturing efficiency, which may ultimately enhance fracture geometries and overall stimulation potential from fracturing treatments. In contrast with conventional fluid loss treatments, the methods and treatments of the present disclosure may provide fluid loss control without creating filter cakes and may use additives that are more environmentally friendly (e.g., as compared to diesel and kerosene treatments). The methods and treatments of the present disclosure also may accelerate fracturing fluid recovery and cleanup operations following a fracturing treatment, which in turn may accelerate the production of hydrocarbons and other fluids from a formation.

Figure 1:
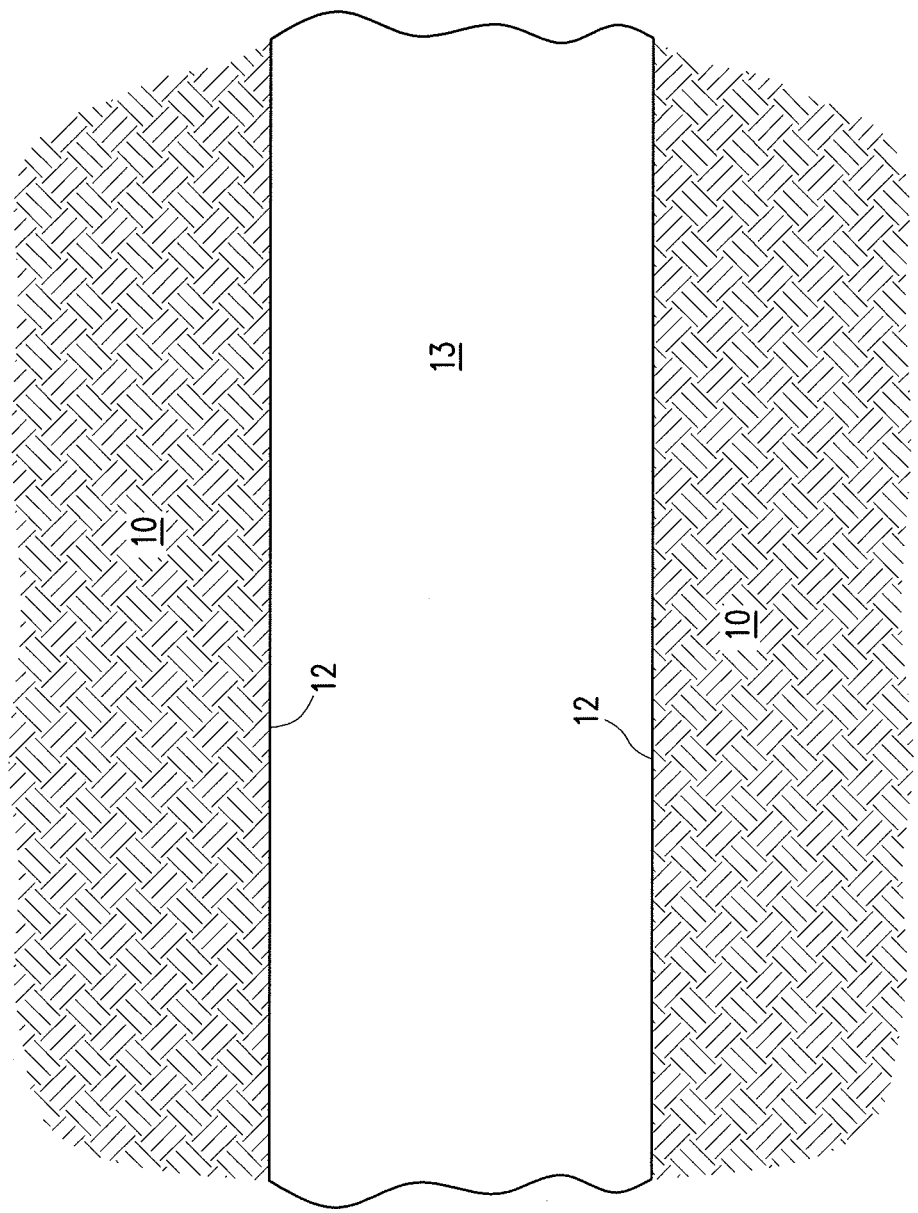
FIG. 1 is a diagram illustrating a portion of a fracture formed in a portion of a subterranean formation.

One embodiment of a method of the present disclosure is illustrated in FIGS. 1-7. FIGS. 1-7 are diagrams illustrating a fracture 13 formed in a portion of a subterranean formation 10, from a perspective looking down on the fracture from above, with a well bore (not shown) penetrating the subterranean formation 10 on the right side of the fracture 13. Referring now to FIG. 1, the fracture faces 12 are the surfaces of the formation 10 adjacent to the open space of the fracture 13. In certain embodiments, this fracture may have been formed or enhanced (e.g., enlarged from a smaller crack or fracture) in the course of a hydraulic fracturing treatment in which one or more fluids are pumped into the formation at or above a pressure sufficient to create or enhance that fracture. In certain embodiments, the fracture 13 may be formed or enhanced just prior to the remaining steps of a treatment of the present disclosure, for example, as illustrated in FIGS. 2-7. The formation 10 may comprise any type of subterranean formation and may be of any composition, including but not limited to sandstone, carbonate (limestone), shale, or combinations thereof. In the embodiment illustrated and described in FIGS. 1-7, the formation 10 is a sandstone formation. In certain embodiments, the methods of the present disclosure may or may not be suitable for formations exhibiting very high permeability. A person of skill in the art with the benefit of this disclosure will recognize circumstances in which the permeability of a particular formation may be too high for the methods of the present disclosure to be practicable. In certain embodiments, a plurality of proppant particulates (not shown) may be present within the open space of fracture 13, among other reasons, to hold the fracture open to facilitate the flow of fluids through the fracture. Such proppant particulates may be deposited in fracture 13 before, after, or during a method of the present disclosure.

Figure 2:
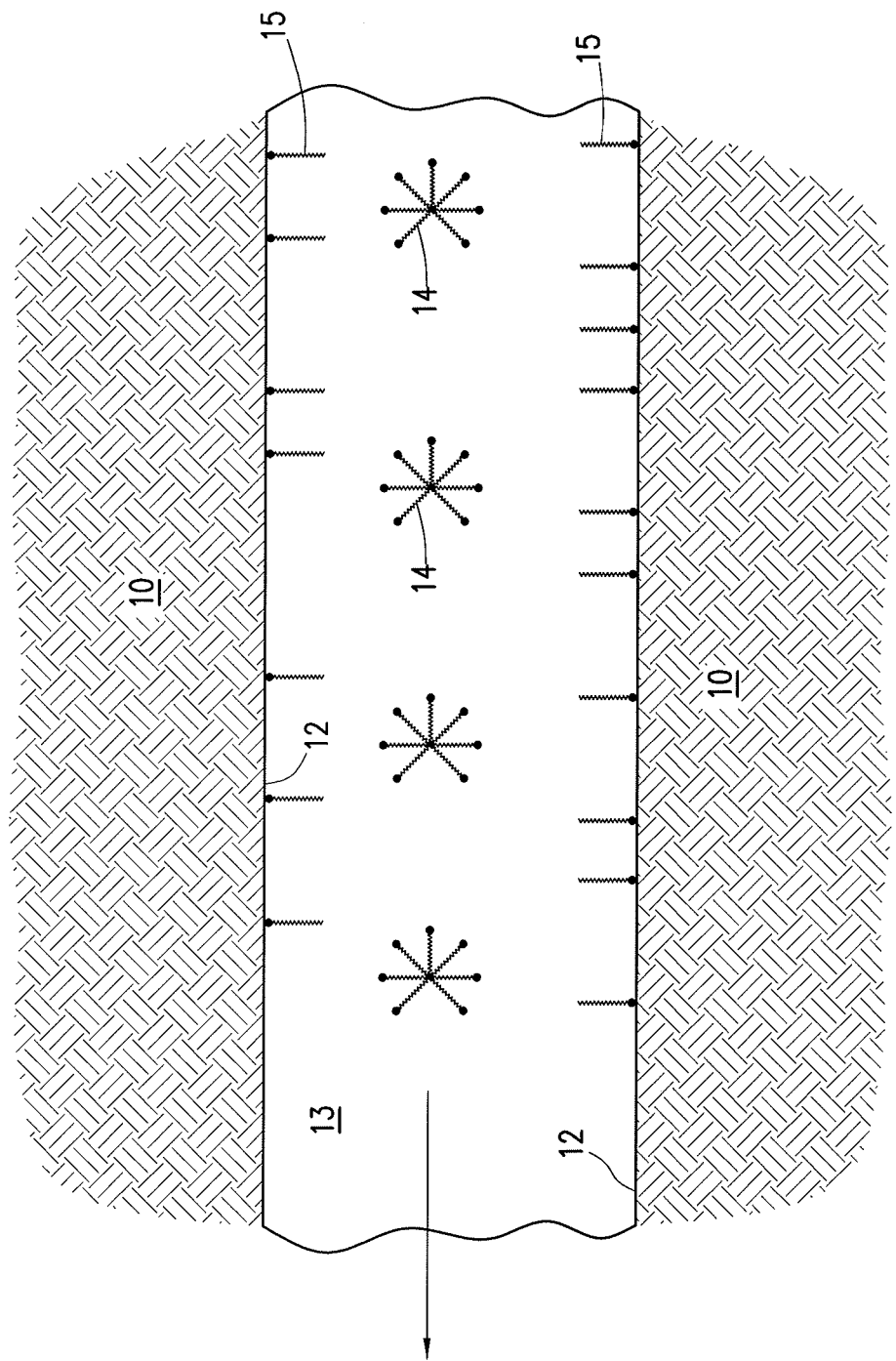
FIG. 2 is a diagram illustrating the treatment of a fracture with a first surfactant according to one embodiment of the present disclosure.
Figure 3:
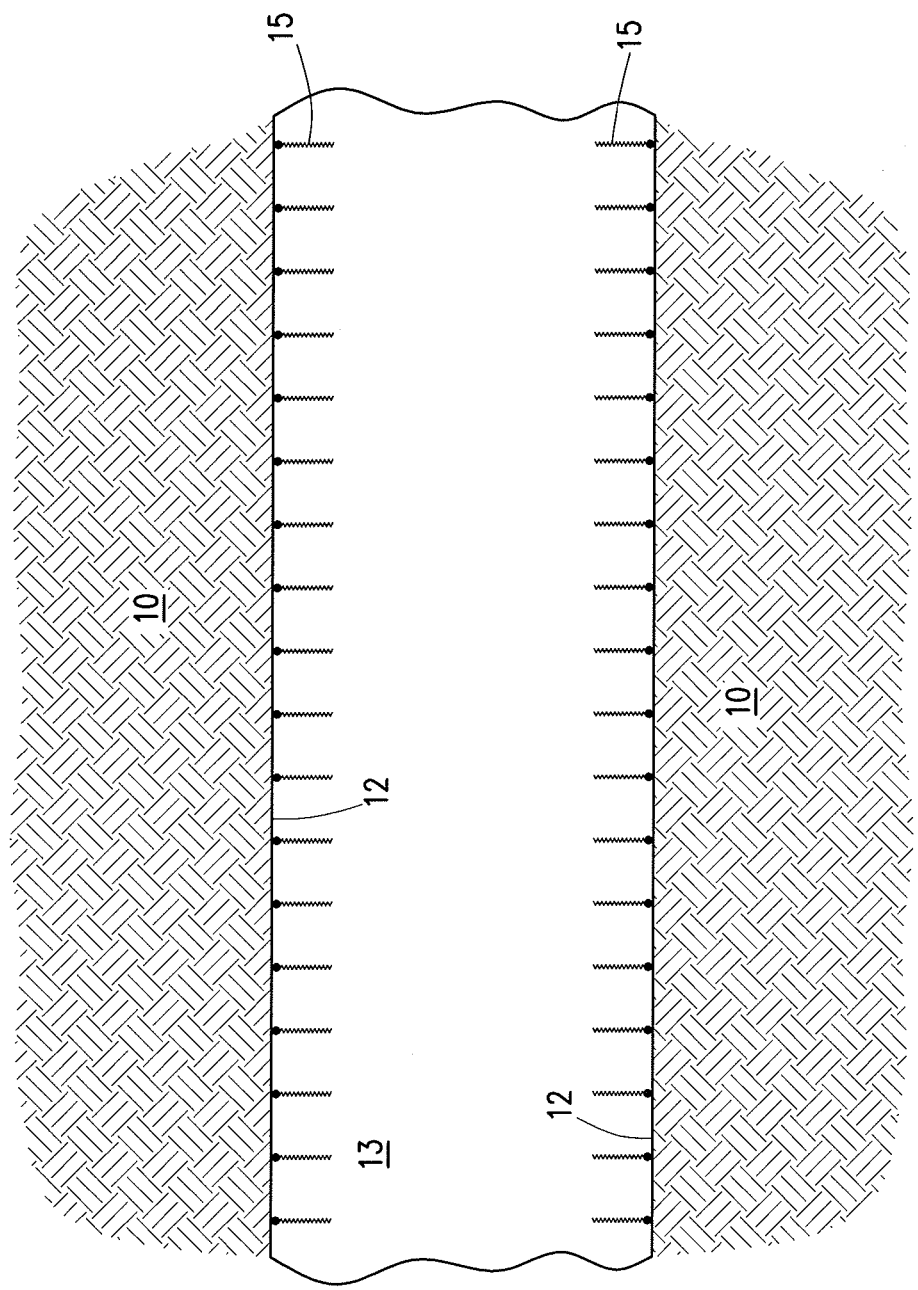
FIG. 3 is a diagram illustrating the fracture following treatment with a first surfactant according to one embodiment of the present disclosure.
Figure 4:
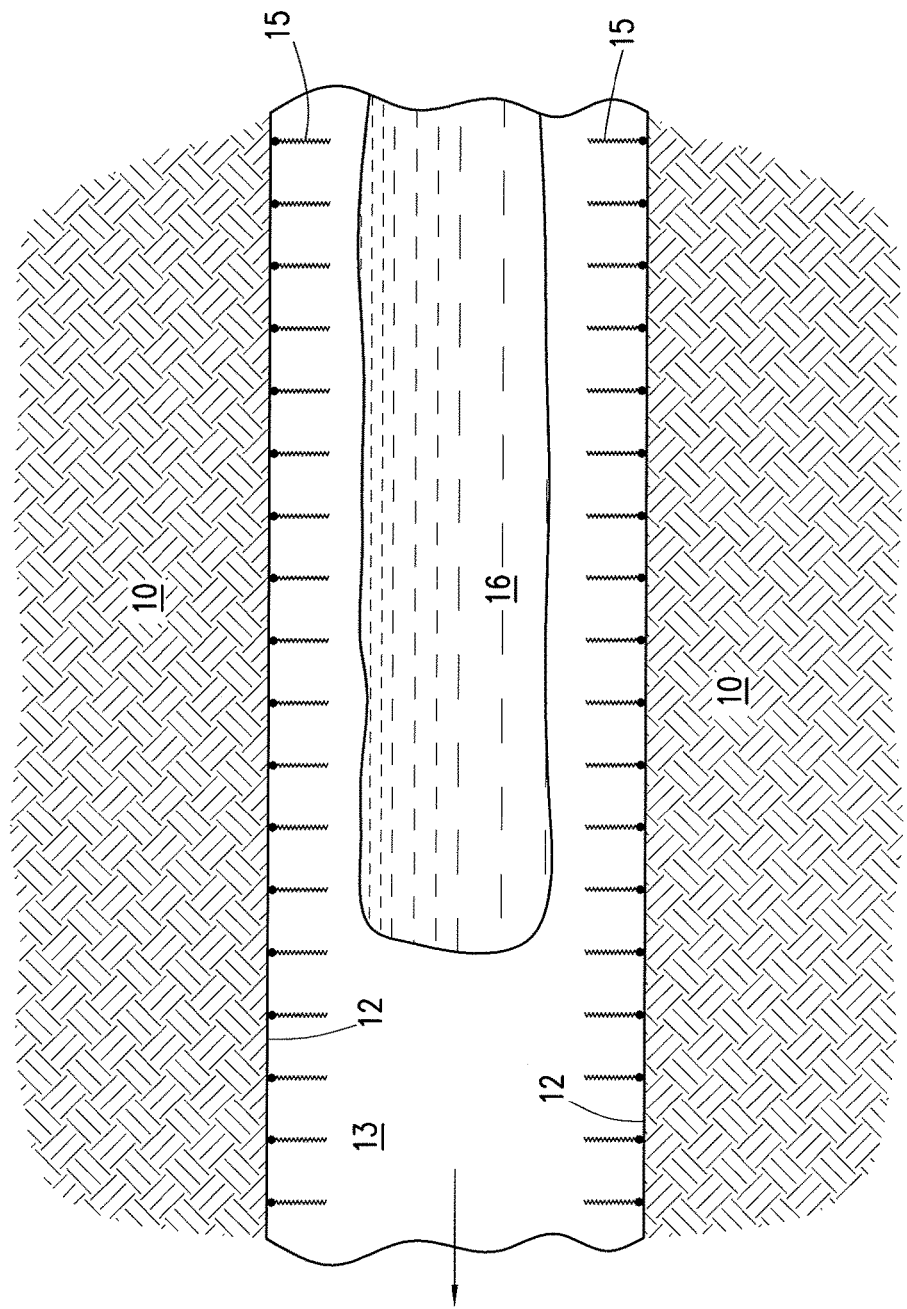
FIG. 4 is a diagram illustrating the flow of a fluid in the fracture shown in FIG. 3 according to one embodiment of the present disclosure.

FIG. 2 illustrates the same fracture 13 shown in FIG. 1 as a first surfactant is introduced into the fracture. The first surfactant may be introduced as a component of a solution or fluid that is injected into the formation, such as a fracturing fluid. As illustrated in FIG. 2, micelles 14 of surfactant molecules often form within a solution or fluid carrying a surfactant. As the micelles 14 of the first surfactant contact the fracture faces 12 in the fracture, molecules of the surfactant 15 may become adsorbed onto the fracture faces 12. This adsorption of surfactant molecules may occur as the fracture and its fracture faces are being formed and/or enlarged, for example, where the first surfactant is present in the fracturing fluid used to form and/or enlarge the fractures or a fluid pumped immediately behind the fracturing fluid. In the embodiment shown in FIG. 2, the first surfactant comprises a cationic surfactant, and the cationic "heads" of the surfactant molecules 15 are attracted to the sandstone fracture faces 12. As illustrated in FIG. 3, the adsorbed molecules 15 of the first surfactant form a layer on the fracture faces 12 which renders those surfaces hydrophobic or oil-wet. FIG. 4 illustrates that, as a water-based fracturing fluid 16 is pumped further into the formation 10 and fracture 13, the hydrophobic surface of the fracture faces 12 may resist the flow of the water-based fluid 16. Because of the pressure being applied in pumping the fracturing fluid 16, the fluid will overcome the resistance in the fracture 13 created by the hydrophobic surface, but that resistance may, among other benefits, reduce the loss of fluid into the formation and help maintain hydraulic pressure. In certain embodiments, one or more spacer fluids (not shown) may be introduced into the formation after the first surfactant but before the fracturing fluid 16 is introduced into the formation.

The first surfactant may be injected into the formation until all or substantially all of the fracture face(s) being treated have been contacted with the first surfactant. In certain embodiments, this may include the tip region(s) of fractures in the formation. A person of skill in the art with the benefit of this disclosure will be able to determine when all or substantially all of the fracture face(s) in a fracture have been treated. For example, the surface area of the fracture faces being treated may be calculated using known or expected geometries of the fracture(s). The amount of fluid and surfactant needed to treat a fixed surface area may be known in the art and/or determined by performing adsorption studies, for example, on core samples from the formation at issue. Using this and other information, a person of skill in the art with the benefit of this disclosure will be able to determine the amount of the first surfactant needed to treat substantially all of the fracture face(s) in a particular application of the present disclosure and, based on the flow rate of the fluids being introduced into the formation as well as other factors, determine the appropriate time to discontinue injection of the first surfactant and begin injecting the second surfactant.

Figure 5:
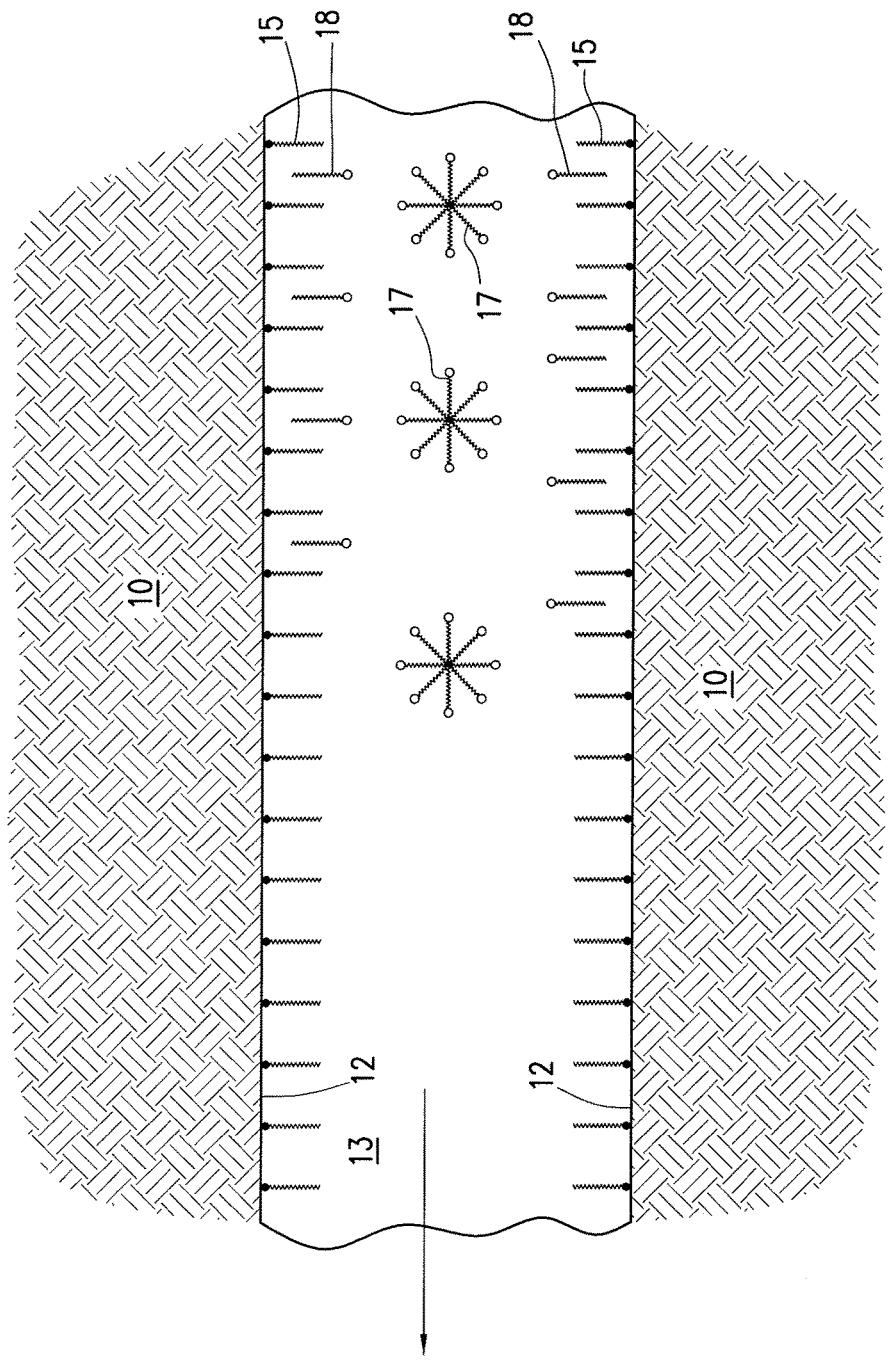
FIG. 5 is a diagram illustrating the treatment of a fracture with a second surfactant according to one embodiment of the present disclosure.
Figure 6:
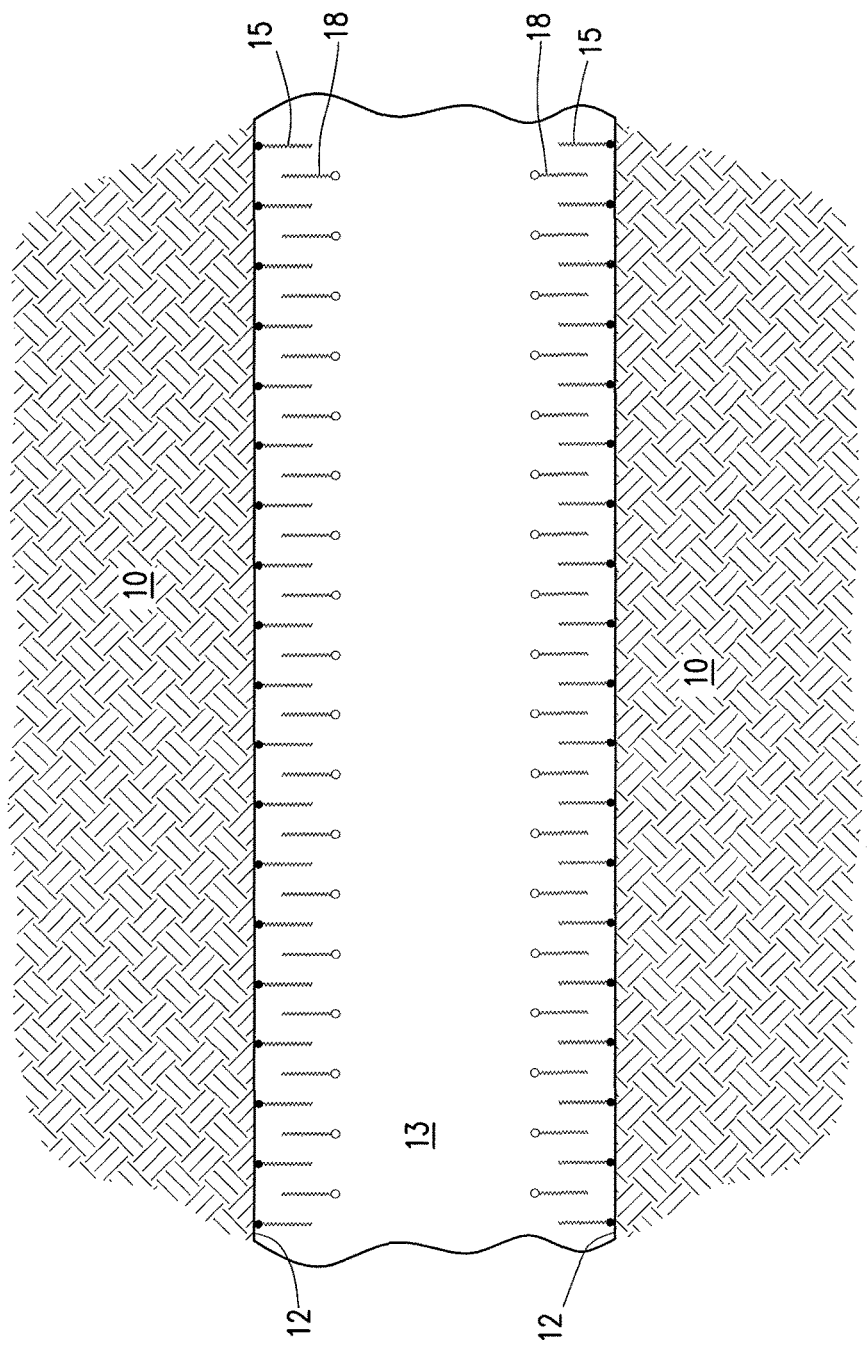
FIG. 6 is a diagram illustrating the fracture following treatment with a second surfactant according to one embodiment of the present disclosure.

As illustrated in FIG. 5, after the fracturing treatment has been completed and substantially all of the fracture faces 12 have been treated with the first surfactant, a second surfactant may be introduced into the fracture 13, which may be introduced as a component of a solution or fluid that is injected into the formation. In certain embodiments, one or more spacer fluids (not shown) may be introduced into the formation after the fracturing treatment has been completed but before the second surfactant is introduced into the formation. As micelles 17 of molecules of the second surfactant travel into the fracture 13, molecules of the second surfactant 18 may become adsorbed onto the fracture faces 12. More specifically, as illustrated in FIG. 5, the molecules 18 may interpenetrate the hydrophobic or oil-wet layer comprising the molecules of the first surfactant 15. The hydrophobic "tails" of the second surfactant 18 may be attracted to the hydrophobic "tails" of the first surfactant 15, causing the molecules of the second surfactant 18 to form a hydrophilic or water-wet layer on top of the oil-wet layer, as illustrated in FIG. 6. In the embodiment illustrated in FIGS.

Figure 7:
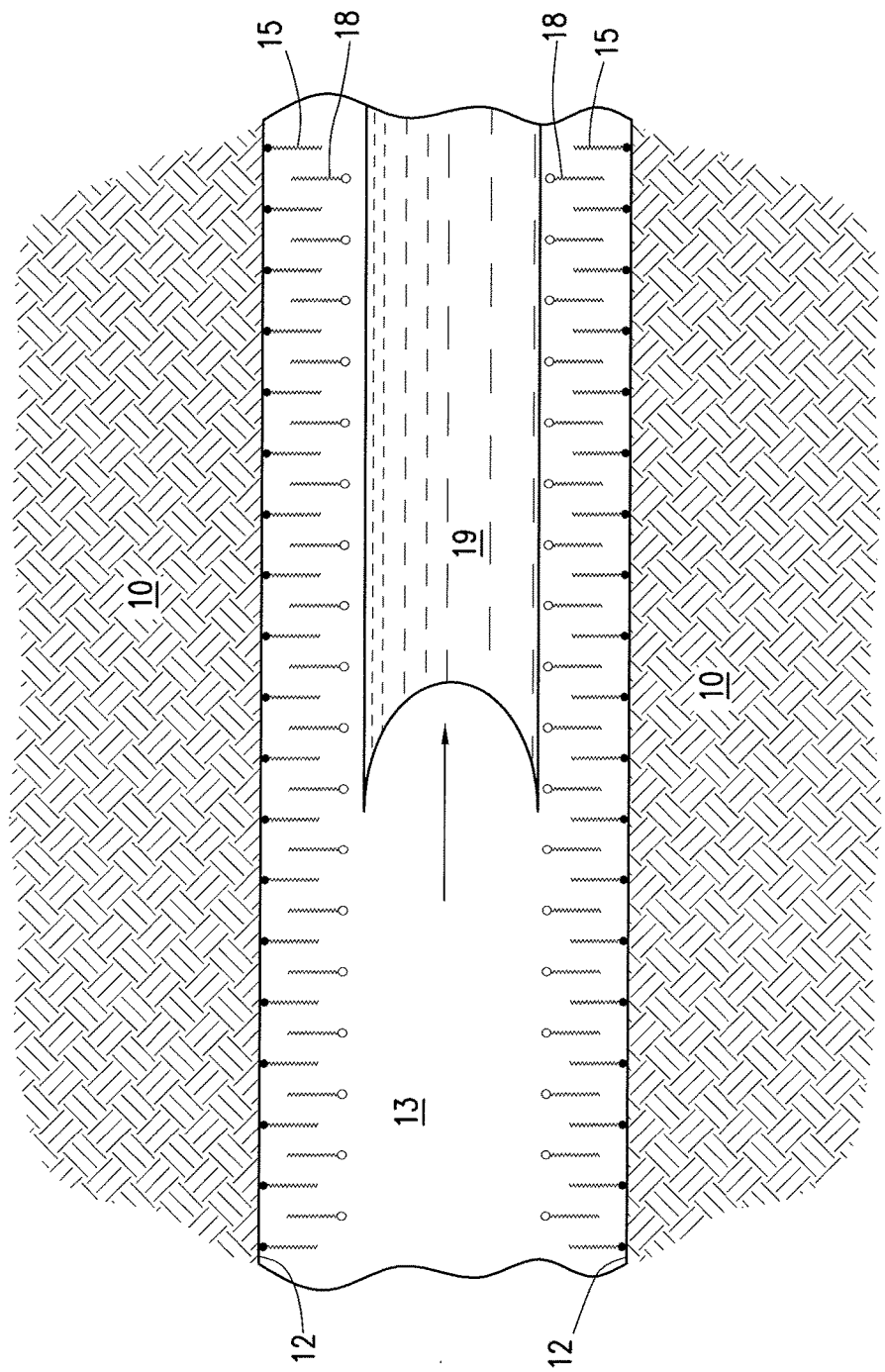
FIG. 7 is a diagram illustrating the flow of a fluid in the fracture shown in FIG. 6 according to one embodiment of the present disclosure.

5-7, the second surfactant comprises an anionic or nonionic surfactant. As illustrated in FIG. 7, the hydrophilic or water-wet surface created by the second surfactant 18 may promote the flow of a water-based fluid 19 (which may comprise, in whole or in part, the water-based fracturing fluid 16 illustrated in FIG. 4) out of the fracture 13, even in the absence of significant differential pressure in that direction. This may, among other benefits, facilitate the recovery of fracturing fluids and/or other water-based fluids out of the formation prior to the production of hydrocarbons from that formation.

The treatment fluids (e.g., fracturing fluids and/or carrier fluids for surfactants, proppants, etc.) used in the methods and treatments of the present disclosure generally comprise a base fluid, which may comprise any liquid known in the art, such as aqueous fluids, non-aqueous fluids, or any mixture thereof. Where the base liquid comprises an aqueous liquid, it may comprise fresh water, salt water (e.g., water containing one or more salts dissolved therein), brine (e.g., saturated salt water), or seawater. Generally, the water can be from any source, provided that it does not contain compounds that adversely affect other components of the fluid. Where the base fluid comprises a non-aqueous liquid, it may comprise any number of organic liquids. Examples of suitable organic liquids include, but are not limited to, mineral oils, synthetic oils, esters, and the like. In certain embodiments, the fluids in the present disclosure may comprise emulsions (including invert emulsions), suspensions, gels, foams, or other mixtures of liquids with solids and/or gases.

The treatment fluids used in the present disclosure optionally may comprise any number of additional additives suitable for the particular application. In certain embodiments, a treatment fluid used in a method or treatment of the present disclosure may further comprise one or more additional surfactants and/or co-surfactants. Examples of other additional additives that may be used include, but are not limited to, salts, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, H2S scavengers, CO2 scavengers, oxygen scavengers, lubricants, additional viscosifiers, weighting agents, relative permeability modifiers, resins, particulate materials (e.g., proppant particulates), coating enhancement agents, and the like. A person skilled in the art, with the benefit of this disclosure, will recognize the types of additives that may be included in the fluids of the present disclosure for a particular application.

The first and second surfactants used in the methods and treatment fluids of the present disclosure may comprise any surfactant or combination of surfactants known in the art that is capable of changing the wettability of a surface. Depending upon the particular application of the methods of the present disclosure, the first and/or second surfactants may be cationic, anionic, nonionic, or amphoteric. Whether a surfactant will increase the oil-wettability or water-wettability of a fracture face will be recognized by a person skilled in the art with the benefit of this disclosure. The suitability of a particular surfactant for use in an embodiment of the present disclosure may depend upon a number of factors, including but not limited to the composition of formation being treated, the conditions in the formation (e.g., temperature, pH, etc.), the desired timing for when the surfactant becomes active, and the like. For example, in an embodiment of the present disclosure in which a sandstone fracture face is treated, the first surfactant may comprise a cationic surfactant and the second surfactant may comprise an anionic surfactant. In an embodiment of the present disclosure in which a limestone fracture face is treated, the first surfactant may comprise a anionic surfactant and the second surfactant may comprise a cationic surfactant. A person skilled in the art, with the benefit of this disclosure, will recognize the types of surfactants that may be suitable in a particular embodiment of the present disclosure.

Types of cationic surfactants that may be suitable for certain embodiments of the present disclosure include, but are not limited to, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, C8 to C22 alkylethoxylate sulfate, trimethylcocoammonium chloride, derivatives thereof, and combinations thereof. Types of anionic surfactants that may be suitable for certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof. Types of non-ionic surfactants that may be suitable for certain embodiments of the present disclosure include, but are not limited to, alcohol oxyalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylates. Examples of non-ionic surfactants that may be suitable include, but are not limited to, POE-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate.

In certain embodiments, the first and/or second surfactants used in the methods of the present disclosure may comprise one or more surfactants in which one end of the surfactant molecule is at least partially obstructed by one or more functional groups (e.g., alkyl groups, aryl groups, esters, amides, or the like) that temporarily inhibits the interaction of that end of the surfactant molecule with the fracture face and/or other components in the formation. Such "end-blocked surfactants" may become "unblocked" or activated after a delay of a certain amount of time at which point the surfactant molecules may more readily interact with the fracture face and, for example, become adsorbed onto a portion of the fracture face. Among other benefits, this may facilitate the treatment of portions of a fracture deeper into the formation than the near well bore portions of the fracture (e.g., the "tip" region of a fracture) by allowing the first and/or second surfactants to travel farther into the fracture before being adsorbed onto the fracture face.

In certain embodiments, the first and/or second surfactants may be included in a fluid or solution introduced into the subterranean formation in a concentration at, around, or above the critical micelle concentration for the particular surfactant(s), which may be the concentration at which the molecules of the surfactant form micelles in a particular fluid. The concentration and/or amounts of the first and/or second surfactants used in certain embodiments of the present disclosure may be based on, at least in part, the composition of the fluid in which the surfactants are provided, temperature, the surface area of the fracture face(s) being treated (which may be calculated using projected and/or actual data regarding the geometries of one or more fractures in the subterranean formation) and the amount of surfactant needed to effectively treat that surface area. A person of skill in the art with the benefit of this disclosure will be able to determine the appropriate amount of the first and second surfactants to use in a particular application of the methods of the present disclosure.

The methods of the present disclosure may be used in any operation in which fracture faces in a subterranean formation are encountered, created, or enhanced. In certain embodiments, these operations may comprise fracturing operations in which the fracture faces being treated are created or enhanced. These fracturing operations may comprise "frac-pack" or "frac-acidizing" operations, which comprise combinations of hydraulic fracturing treatments with gravel packing or acidizing treatments, respectively. In other embodiments, the methods of the present disclosure may be used in the course of an operation that does not involve creating or enhancing fractures but where existing fracture faces (e.g., fracture faces formed in the course of a previously-performed fracturing operation) are encountered and treated. Such treatments may be performed in conjunction with any subterranean operation known in the art, including but not limited to preflush treatments, afterflush treatments, sand control treatments (e.g., gravel packing), acidizing treatments (e.g., matrix acidizing), well bore clean-out treatments, and the like.

In one embodiment, the present disclosure provides a method comprising: introducing a first surfactant into a portion of a subterranean formation; allowing the first surfactant to increase the oil-wettability of at least a portion of a fracture face in the portion of the subterranean formation; ceasing the introduction of the first surfactant into the portion of the subterranean formation; introducing a second surfactant into the portion of the subterranean formation; and allowing the second surfactant to increase the water-wettability of the portion of the fracture face in the portion of the subterranean formation.

In another embodiment, the present disclosure provides a method comprising: introducing a fracturing fluid into a well bore penetrating at least a portion of a subterranean formation at or above a pressure sufficient to create or enhance a fracture in the subterranean formation, wherein the fracture comprises at least one fracture face; introducing a first surfactant into the fracture; allowing the first surfactant to increase the oil-wettability of at least a portion of the fracture face in the fracture; ceasing the introduction of the first surfactant into the fracture; introducing a second surfactant into the fracture; and allowing the second surfactant to increase the water-wettability of at least a portion of the fracture face in the fracture.

In another embodiment, the present disclosure provides a method comprising: (a) providing a fracturing fluid comprising an aqueous base fluid and a first surfactant that is capable of increasing the oil-wettability of a fracture face in a subterranean formation; (b) introducing the fracturing fluid into a well bore penetrating at least a portion of a subterranean formation at or above a pressure sufficient to create or enhance a fracture in the subterranean formation; (c) introducing a second surfactant that is different from the first surfactant and capable of increasing the water-wettability of at least a portion of a fracture face into the well bore; and (d) allowing at least a portion of the fracturing fluid to flow out of the well bore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
introducing an aqueous fracturing fluid that comprises a first surfactant and does not comprise proppant particulates into a well bore penetrating at least a portion of a subterranean formation at or above a pressure sufficient to create or enhance a fracture in the subterranean formation, wherein the fracture comprises a fracture face;

introducing the first surfactant into the fracture;

allowing the first surfactant to increase the oil-wettability of at least a portion of the fracture face in the fracture;

ceasing the introduction of the first surfactant into the fracture;

introducing a second surfactant into the fracture;

allowing the second surfactant to increase the water-wettability of at least a portion of the fracture face in the fracture; and allowing at least a portion of the aqueous fracturing fluid to flow out of the well bore after the second surfactant has increased the water-wettability of at least a portion of the fracture face in the fracture.

2. The method of claim 1 wherein the first surfactant comprises a cationic surfactant and the second surfactant comprises an anionic surfactant.

3. The method of claim 1 wherein the first surfactant comprises a cationic surfactant and the second surfactant comprises a non-ionic surfactant.

4. The method of claim 1 wherein the first surfactant comprises an anionic surfactant and the second surfactant comprises a cationic surfactant.

5. The method of claim 1 wherein the first surfactant comprises a non-ionic surfactant and the second surfactant comprises a cationic surfactant.

6. The method of claim 1 wherein the first surfactant comprises a non-ionic surfactant and the second surfactant comprises an anionic surfactant.

7. A method comprising:
(a) providing an aqueous fracturing fluid comprising an aqueous base fluid and a first surfactant that is capable of increasing the oil-wettability of a fracture face in a subterranean formation, wherein the aqueous fracturing fluid does not comprise proppant particulates;
(b) introducing the aqueous fracturing fluid into a well bore penetrating at least a portion of a subterranean formation at or above a pressure sufficient to create or enhance a fracture in the subterranean formation that comprises a fracture face;
(c) allowing the first surfactant to increase the oil-wettability of at least a portion of the fracture face in the fracture;
(d) introducing a second surfactant that is different from the first surfactant and capable of increasing the water-wettability of at least a portion of the fracture face into the well bore;
(e) allowing the second surfactant to increase the water-wettability of at least a portion of the fracture face; and
(f) after step (e), allowing at least a portion of the aqueous fracturing fluid to flow out of the well bore.

8. The method of claim 7 wherein the first surfactant comprises a cationic surfactant and the second surfactant comprises an anionic surfactant.

9. The method of claim 7 wherein the first surfactant comprises a cationic surfactant and the second surfactant comprises a non-ionic surfactant.

10. The method of claim 7 wherein the first surfactant comprises an anionic surfactant and the second surfactant comprises a cationic surfactant.

11. The method of claim 7 wherein the first surfactant comprises a non-ionic surfactant and the second surfactant comprises a cationic surfactant.

12. The method of claim 7 wherein the first surfactant comprises a non-ionic surfactant and the second surfactant comprises an anionic surfactant.

13. A method comprising:
introducing an aqueous fracturing fluid that comprises a first surfactant into a well bore penetrating at least a portion of a subterranean formation at or above a pressure sufficient to create or enhance a fracture in the subterranean formation, wherein
the fracture comprises a fracture face,
the aqueous fracturing fluid does not comprise proppant particulates, and
the first surfactant comprises a hydrophobic tail;
introducing the first surfactant into the fracture such that the first surfactant forms an oil-wet layer on at least a portion of the fracture face in the fracture;
ceasing the introduction of the first surfactant into the fracture;
introducing a second surfactant that comprises a hydrophobic tail into the fracture, wherein the hydrophobic tail of the second surfactant is attracted to the hydrophobic tail of the first surfactant in the fracture such that the second surfactant forms a water-wet layer on top of at least a portion of the oil-wet layer; and
allowing at least a portion of the aqueous fracturing fluid to flow out of the well bore after the second surfactant has increased the water-wettability of at least a portion of the fracture face in the fracture.

14. The method of claim 13 wherein the first surfactant comprises a cationic surfactant and the second surfactant comprises an anionic surfactant.

15. The method of claim 14, wherein the cationic surfactant comprises at least one surfactant selected from the group consisting of: an alkyl amine, an alkyl amine salt, a quaternary ammonium salt, an amine oxide, an alkyltrimethyl amine, a triethyl amine, an alkyldimethylbenzylamine, an alkylamidobetaine, an alpha-olefin sulfonate, a C8 to C22 alkylethoxylate sulfate, trimethylcocoammonium chloride, any derivative thereof, and any combination thereof.

16. The method of claim 13 wherein the first surfactant comprises a cationic surfactant and the second surfactant comprises a non-ionic surfactant.

17. The method of claim 13 wherein the first surfactant comprises an anionic surfactant and the second surfactant comprises a cationic surfactant.

18. The method of claim 17, wherein the anionic surfactant comprises at least one surfactant selected from the group consisting of: an alkyl carboxylate, an alkylether carboxylate, an N-acylaminoacid, an N-acylglutamate, an N-acylpolypeptide, an alkylbenzenesulfonate, a paraffinic sulfonate, an alpha-olefin sulfonate, a lignosulfate, a sulfosuccinate, a polynapthylmethylsulfonate, an alkyl sulfate, an alkylethersulfate, a monoalkylphosphate, a polyalkylphosphate, a fatty acid, an alkali salt of an acid, an alkali salt of a fatty acid, an alkaline salt of an acid, a sodium salt of an acid, a sodium salt of a fatty acid, an alkyl ethoxylate, a soap, any derivative thereof, and any combination thereof.

19. The method of claim 13, wherein the fracture face comprises sandstone and the first surfactant comprises a cationic surfactant.

20. The method of claim 13, wherein the fracture face comprises limestone and the first surfactant comprises an anionic surfactant.

* * * * *